United States Patent [19]
Senkbeil

[11] 3,854,926
[45] Dec. 17, 1974

[54] METHOD OF CONTROLLING UNDESIRED VEGETATION WITH 2H-PYRIDO (3,2-B)--1,4-OXAZIN-3(4H) ONES

[75] Inventor: Herman O. Senkbeil, Midland, Mich.

[73] Assignee: The Dow Chemical Company, Midland, Mich.

[22] Filed: June 4, 1973

[21] Appl. No.: 366,896

[52] U.S. Cl.................. 71/94, 71/88, 260/244 R
[51] Int. Cl............................ A01n 9/22
[58] Field of Search................ 71/94, 88

[56] References Cited
UNITED STATES PATENTS

| | | | |
|---|---|---|---|
| 2,806,031 | 9/1957 | Rigterink | 71/88 |
| 2,811,523 | 10/1957 | Rigterink | 71/88 |
| 3,381,016 | 4/1968 | Markillie | 71/88 |
| 3,420,824 | 1/1969 | Ellis | 71/94 |

FOREIGN PATENTS OR APPLICATIONS

| | | | |
|---|---|---|---|
| 452,528 | 5/1968 | Switzerland | 71/94 |
| 452,529 | 5/1968 | Switzerland | 71/94 |

*Primary Examiner*—Glennon H. Hollrah
*Attorney, Agent, or Firm*—Gary D. Street

[57] ABSTRACT

This invention relates to agronomic practices and to the use of certain compositions as herbicides. More particularly, it has been found that certain 2H-pyrido(3,2-b)-1,4-oxazin-3(4H)-ones possess herbicidal properties and are particularly useful as pre-emergent herbicides.

12 Claims, No Drawings

METHOD OF CONTROLLING UNDESIRED VEGETATION WITH 2H-PYRIDO (3,2-B)-1,4-OXAZIN-3(4H) ONES

BACKGROUND OF THE INVENTION

1. Field

The present invention is related to various 2H-pyrido(3,2-b)-1,4-oxazin-3(4H)ones which are useful as herbicides.

2. Prior Art

The closest known prior art to the instantly claimed invention is Swiss Pat. No. 452,528, which discloses various pyrido-oxazin derivatives having pharmacological activity, e.g., analagesic, antitussive, spasmolytic, antiphlogistic, antipyretic and local anesthetic properties. No reference to herbicidal activity for any of the compounds is made in the above-mentioned patent.

SUMMARY OF THE INVENTION

This invention provides a method for the preemergent control of undesired plants which comprises applying to the locus of the plant seeds a herbicidally effective amount of a compound represented by the formula:

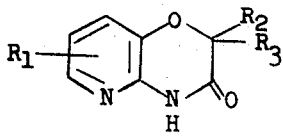

wherein $R_1$ is hydrogen, methyl or halo, and $R_2$ and $R_3$ each independently represent hydrogen or a lower alkyl group of from 1 to 3 carbon atoms.

In the present specification and claims, the term "halo" means chloro, bromo or fluoro while the term "loweralkyl" means methyl, ethyl, isopropyl or propyl.

DETAILED DESCRIPTION OF THE INVENTION

The compounds employed in the methods of the present invention can be prepared according to the methods described in Swiss Pat. No. 452,528. The following examples demonstrate typical methods of preparing the herbicidal compounds contemplated herein.

EXAMPLE 1

A warm solution of 2-amino-3-hydroxypyridine (22.0 grams; 0.2 mole) in 250 milliliters (ml) of dimethylformamide was added dropwise to a solution of sodium hydride (50%) (9.6 grams; 0.2 mole) in 150 ml. of dimethylformamide under nitrogen. The addition was carried out over a period of about 30 minutes with stirring. During the addition, the reaction mixture temperature rose from 24°C. to about 41°C. Following the completion of the dropwise addition, the reaction mixture was stirred for a period of about 20 minutes, the reaction mixture temperature dropping to about 35°C. during this period. Ethyl bromoacetate (33.4 grams; 0.2 mole) was then added with stirring over a 20 minute period, with the reaction mixture temperature increasing to about 47°C. The reaction mixture was then heated for a period of about 1 hour at 80°C., cooled, and poured into an ice water mixture. The precipitate formed upon cooling was recovered by vacuum filtration of the solvent and recrystallized from chloroform.

As a result of these operations, the desired 2H-pyrido(3,2-b)-1,4-oxazin-3(4H)-one compound was recovered as a crystalline solid having a melting point of 206°–208°C.

The following compounds employed in the present invention are prepared utilizing the appropriate starting materials according to procedures similar to those set forth in Example 1.

2-Methyl-2H-pyrido(3,2-b)-1,4-oxazin-3(4H)-one, having a melting point of 170°–171°C. by reacting together 2-amino-3-hydroxypyridine and ethyl 2-bromopropionate;

2,2-Dimethyl-2H-pyrido(3,2-b)-1,4-oxazin-3(4H)-one, having a melting point of 146°–147°C., by reacting together 2-amino-3-hydroxypyridine and ethyl 2-bromo-2-methylpropionate;

6-Methyl-2H-pyrido(3,2-b)-1,4-oxazin-3(4H)-one, having a melting point of 153.5°C., by reaction together 2-amino-3-hydroxy-6-methyl pyridine and ethyl bromoacetate;

7-Chloro-2-methyl-2H-pyrido(3,2-b)-1,4-oxazin-3(4H)-one, having a melting point of 193.5° to 195°C., by reacting together 2-amino-5-chloro-3-hydroxypyridine and ethyl 2-bromopropionate;

2-Propyl-2H-pyrido(3,2-b)-1,4-oxazin-3(4H)-one, having a melting point of 132°–133°C., by reacting together 2-amino-3-hydroxypyridine and ethyl 2-bromovalerate;

2,6-Dimethyl-2H-pyrido(3,2-b)-1,4-oxazin-3(4H)-one, having a melting point of 139°–141°C., by reacting together 2-amino-3-hydroxy-6-methylpyridine and ethyl 2-bromopropionate;

6-Bromo-2-ethyl-2H-pyrido(3,2-b)-1,4-oxazin-3(4H)-one, by reaction together 2-amino-6-bromo-3-hydroxypyridine and ethyl 2-bromobutyrate;

7-Fluoro-2,2-dimethyl-2H-pyrido(3,2-b)-1,4-oxazin-3(4H)-one, by reacting together 2-amino-5-fluoro-3-hydroxypyridine and ethyl 2-bromo-2-methylpropionate;

7-Methyl-2-propyl-2H-pyrido(3,2-b)-1,4-oxazin-3(4H)-one, by reacting together 2-amino-3-hydroxy-5-methyl pyridine and ethyl 2-bromovalerate; and 6-Chloro-2-propyl-2H-pyrido(3,2-b)-1,4-oxazin-3(4H)-one, by reacting together 2-amino-6-chloro-3-hydroxypyridine and ethyl 2-bromovalerate.

In carrying out the method of this invention for controlling plant growth the herbicides can be applied in various ways. They can be applied per se, but they are usually applied as the toxic components in herbicidal compositions, comprising a growth-controlling amount of the herbicide and a carrier for the herbicide. Compositions can be applied as dust, as liquid spray or as gas-propelled sprays. In addition to the carrier, they can contain additives such as emulsifying agents, wetting agents, binding agents, gases compressed to the liquid state, odorants, and stabilizers. Liquid and solid carriers known as carriers for herbicides include water, organic solvents, mineral oils, clays and ground walnut shells. Thus, for example, a compound can be dispersed on a finely divided solid and employed therein as a dust. Also, the compounds, or a solid composition comprising the compound, can be dispersed in water, typically with the aid of a wetting agent, and the resulting aqueous suspension employed as a spray. In other procedures, the compound can be employed as a constituent of organic liquid compositions, oil-in-water and water-in-oil emulsions, or water dispersions, with or without the addition of wetting, dispersing or emulsifying agents.

Liquid compositions containing the desired amount of active ingredient can be prepared by dissolving the active compound in an organic liquid carrier or by dispersing the compound in water with or without the aid of a suitable surface-active dispersing agent such as an ionic or non-ionic emulsifying agent. Suitable organic liquid carriers include the agricultural spray oils and the petroleum distillates such as diesel fuel, kerosene, fuel oil, naphthas and Stoddard solvent. Among the organic liquid carriers, the petroleum distillates are generally preferred. The aqueous compositions can contain one or more water immiscible solvents for the active compound. In such compositions, the carrier comprises an aqueous emulsion, i.e., a mixture of water, emulsifying agent and water immiscible solvent. The choice of dispersing and emulsifying agent and the amount thereof employed is dictated by the nature of the composition and by the ability of the agent to facilitate the dispersion of the active compound in the carrier to produce the desired composition. Dispersing and emulsifying agents which can be employed in the compositions include the condensation products of alkylene oxides with phenols and organic acids, alkyl aryl sulfonates, polyoxyalkylene derivatives of sorbitan esters, complex ether alcohols, mahogany soaps, and the like.

In the preparation of dust compositions, the active ingredient is dispersed in and on a finely divided solid carrier such as clay, talc, chalk, gypsum, bentonite, fuller's earth, attapulgite, and the like. In such operation, the finely divided carrier is mechanically mixed or ground with the active compound. Depending upon the proportion of ingredients, these dust compositions can be employed as concentrates and subsequently diluted with additional solid carrier or with liquid or solid surface-active dispersing agent to obtain the desired amount of active ingredient in a composition adapted to be employed for the suppression of the growth of the plants. Also, such dust compositions can be dispersed in water, preferably with the aid of a surface-active dispersing agent to form spray mixtures.

The concentration of the compounds of the present invention in liquid or dry compositions generally ranges from about 1.0 to about 50.0 percent by weight although concentrations of up to about 95 weight percent are often employed. In compositions to be employed as concentrates, the active compound can usually be present in a concentration of from about 40 to about 98 weight percent.

The exact quantity of the compounds of this invention to be utilized in herbicidal compositions, as is well known to those skilled in the art, will be found to vary rather widely. It depends to some extent on the type of the composition in which the material is being employed, the method of application, the nature of the condition to be controlled, and other commonly encountered factors. Thus, it is to be understood that all of the compounds employed in the present invention may not be equally effective at similar concentrations or against the same plant species. In practice, herbicidal application is measured in terms of pounds of herbicides applied per acre. The compounds employed in the present invention are effective when applied in growth controlling amounts, i.e., in rates between about 1 pound and about 20 or more pounds per acre.

As used herein, the term "locus of the plant seeds" is meant to be inclusive of any substance in which plants grow or can grow, including earth, sand, and decayed plant and animal matter.

Typical aqueous concentrate compositions containing the active compounds of the present invention are prepared as follows:

Four parts by weight of the selected compound, 0.08 part of sorbitan trioleate (Span 85), and 0.02 part of a sorbitan monooleate polyoxyethylene derivative (Tween 80) are dispersed in 40 milliliters of acetone to produce a concentrate composition in the form of a water-dispersible liquid containing the selected compound as the sole active agent. A portion of this concentrate composition is separately dispersed in a portion of water to provide an aqueous composition containing 0.44 pound of the active compound per 100 gallons of ultimate aqueous mixture.

The aqueous composition is then employed for the treatment of seed beds of good agricultural soil which have been prepared and seeded with the seeds of various grass species and broadleaf plants. In typical treating operations, a predetermined quantity of the composition is applied to a seedbed as a soil drench at a rate of about 0.43 acre inch of aqueous composition per acre. The quantities are controlled to supply a substantial uniform dosage in a seedbed equivalent to from 1.0 to 20.0 pounds of the active compound per acre. Other seedbeds are similarly seeded with the named plant species but are left untreated to serve as checks. About 2 weeks following the treatment the seedbeds are examined to ascertain what control of the growth of seeds has been obtained.

In representative operations, carried out according to the previously described procedures, each of the 2H-pyrido-(3,2-b)-1,4-oxazin-3(4H)-one and 2-methyl-2H-pyrido(3,2-b)-1,4-oxazin-3(4H)-one compounds gives complete control of pigweeds, wild mustard charlock and bindweed when the seeds of such species are contacted with sufficient amounts of compositions, prepared as previously indicated, containing one of the named compounds to provide a dosage rate of one pound per acre. At a dosage rate of 2.0 pounds per acre, the 2H-pyrido(3,2-b)-1,4-oxazin-3(4H)-one compound gives complete pre-emergent control of ragweed, wild oats and crabgrass.

In similar additional operations, each of the 2,2-dimethyl-2H-pyrido(3,2-b)-1,4-oxazin-3(4H)-one, 6-methyl-2H-pyrido(3,2-b)-1,4-oxazin-3(4H)-one, 7-chloro-2-methyl-2H-pyrido(3,2-b)-1,4-oxazin-3(4H)-one, 2-propyl-2H-pyrido(3,2-b)-1,4-oxazin-3(4H)-one and 2,6-dimethyl-2H-pyrido(3,2-b)-1,4-oxazin-3(4H)-one compounds gives substantial to complete control of wild-mustard charlock when applied to the seeds thereof at a dosage rate of 20 pounds per acre.

In further representative operations, the 2,6-dimethyl-2H-pyrido(3,2-b)-1,4-oxazin-3(4H)-one compound gives substantial control of crabgrass, barnyard grass and yellow foxtail when the seeds of such species are contacted with sufficient amounts of the compositions containing the indicated compound to provide a dosage rate of 20 pounds per acre.

As will be evident to those skilled in the art, various modifications on this invention can be made or followed, in the light of the foregoing disclosure and discussion, without departing from the spirit or scope of

What is claimed is:

1. The method of controlling undesired plants which comprises applying to the locus of seeds of undesired plants a herbicidally-effective amount of a compound corresponding to the formula:

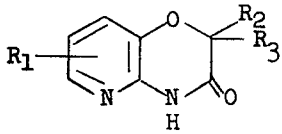

wherein $R_1$ is hydrogen, methyl or halo, and $R_2$ and $R_3$ each independently represent hydrogen or a lower alkyl group of from 1 to 3 carbon atoms.

2. The method of claim 1 wherein $R_1$ is hydrogen.
3. The method of claim 1 wherein $R_2$ and $R_3$ are hydrogen.
4. The method of claim 1 wherein at least one of $R_2$ and $R_3$ is hydrogen.
5. The method of claim 1 wherein $R_1$ is methyl.
6. The method of claim 1 wherein the compound is 2H-pyrido(3,2-b)-1,4-oxazin-3(4H)-one.
7. The method of claim 1 wherein the compound is 2-methyl-2H-pyrido(3,2-b)-1,4-oxazin-3(4H)-one.
8. The method of claim 1 wherein the compound is 2,2-dimethyl-2H-pyrido(3,2-b)-1,4-oxazin-3(4H)-one.
9. The method of claim 1 wherein the compound is 6-methyl-2H-pyrido(3,2-b)-1,4-oxazin-3(4H)-one.
10. The method of claim 1 wherein the compound is 7-chloro-2-methyl-2H-pyrido(3,2-b)-1,4-oxazin-3(4H)-one.
11. The method of claim 1 wherein the compound is 2-propyl-2H-pyrido(3,2-b)-1,4-oxazin-3(4H)-one.
12. The method of claim 1 wherein the compound is 2,6-dimethyl-2H-pyrido(3,2-b)-1,4-oxazin-3(4H)-one.

* * * * *